A. B. G. A. WILLIAMS.
VEHICLE HUB AND AXLE.

No. 177,309. Patented May 9, 1876.

Attest:
Jos. L. Coombs
Albert H. Norris

Inventor:
Aaron B. G. A. Williams
By James L. Norris
his atty

N. PETERS, PHOTO-LITHOGRAPHER, WASHINGTON, D. C.

UNITED STATES PATENT OFFICE.

AARON B. G. A. WILLIAMS, OF GOSHEN, INDIANA, ASSIGNOR OF ONE-HALF HIS RIGHT TO RUEL M. JOHNSON, OF SAME PLACE.

IMPROVEMENT IN VEHICLE HUBS AND AXLES.

Specification forming part of Letters Patent No. 177,309, dated May 9, 1876; application filed May 7, 1875.

*To all whom it may concern:*

Be it known that I, AARON B. G. A. WILLIAMS, of Goshen, in the county of Elkhart and State of Indiana, have invented certain new and useful Improvements in Carriage-Hubs, of which the following is a specification:

This invention relates to certain improvements in the construction of hubs and axles for carriages and other vehicles; and it consists in the novel construction and arrangement of the parts, as will be hereinafter more fully set forth, and pointed out in the claim.

Figure 1:
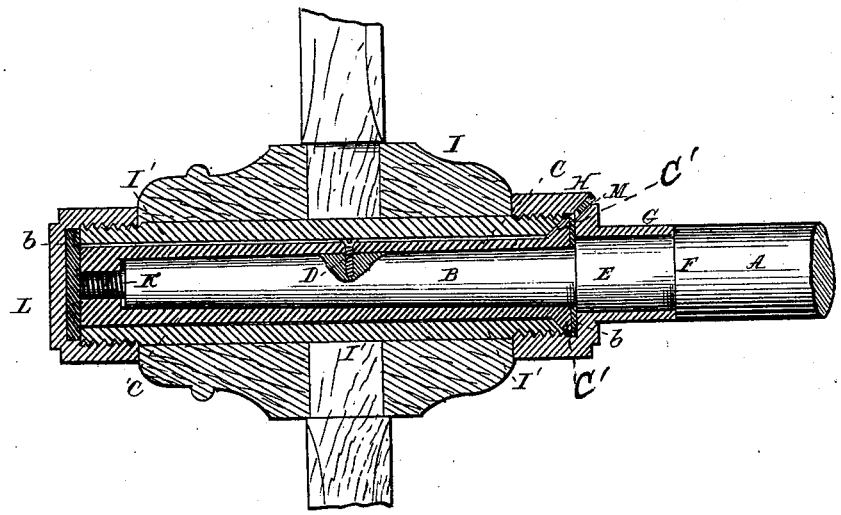
Figure 2:
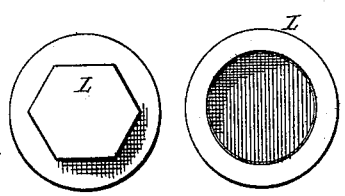
Figure 3:
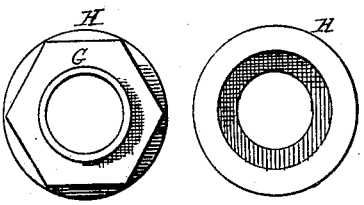

In the drawings, Figure 1 represents a longitudinal sectional view of an axle and hub, constructed accoring to my invention; Fig. 2, a detached view of the hub-band; Fig. 3, a detached view of the sand-cap.

The letter A represents the axle-stock, and B the spindle, at the end of the same. C represents a detachable sleeve, fitting over the spindle B, and screwed rigidly to the said spindle by means of a screw-threaded nib on the end of the axle-spindle engaging with a screw-threaded shoulder on the outer end of the sleeve, and, as an additional fastening, a set-screw, D, passing through perforations made in the sleeve and axle-spindle. E represents a cylindrical journal formed between the shoulder F and spindle B upon the axle-stock, somewhat larger in diameter than the adjacent portion of the spindle, and G represents a sleeve, provided with a sand-cap, H, the sleeve fitting over and revolving upon the journal E, and the cap fitting over the inner part of the box in the hub I, to which it is rigidly secured so as to revolve with it by any suitable means, a screw-cap being represented in the present instance.

The hub I is formed in the usual manner, and bored and provided with a hub-box, I', so as to fit over the sleeve C, the exterior of which is turned and finished so as to accurately fit said box.

The sleeve C is formed with a conical shoulder, C', which sets into and revolves in a similarly-shaped seat in the end of the hub-box I', forming a close connection therewith, and preventing rattling and the entrance of sand to the wearing parts of the hub and axle.

K represents a screw-nib on the end of the axle B, serving to secure the sleeve and axle together, and L a hub-band, setting over the end of the hub-box and confined thereon by means of a screw-thread, set-screws, or other convenient means. Said band serves to cover the end of the hub and the screw-nib, and prevents the entrance of sand or grit and escape of oil, also giving the wheel a neat and ornamental appearance.

M represents an oil-passage, extending through the sand-cap, the hub, or the hub-band, and communicating with longitudinal spiral or annular grooves formed on the interior of the hub-box, or on the sleeve, for the purpose of supplying oil or other lubricant to the same, without the necessity of removing the wheel. Said passage is provided with a plug, or with an ordinary oil-cup and cock, for the purpose of confining the oil between the bearing-surfaces of the hub-box and the sleeve, to prevent waste, and the consequent defacing of the wheel by the escape of the oil.

The operation of my improved axle and nut will be readily understood from the foregoing description without further explanation, and it will be observed that there is no wear upon the spindle or axle, but that the entire wear is upon the sleeve and hub-box, which sleeve and hub-box can, with little expense, be removed and replaced by new ones when worn to such an extent as to render them useless.

I am aware that an axle having a square spindle, over which fits a detachable sleeve having a collar, has heretofore been employed, and I therefore lay no claim to such invention; and I am also aware that a pipe-box, exteriorly-threaded at its inner end for the reception of an interiorly screw-threaded sand-cap, has heretofore been employed, and I therefore lay no claim to such invention.

Having thus fully described my invention, what I claim, and desire to secure by Letters Patent, is—

The combination of the detachable tubular sleeve C, having the conical shoulders C' at its inner end, and screw-threaded shoulder at its outer end, the cylindrical axle-spindle B, provided with the screw-threaded nib K at its outer end and the cylindrical journal E, the hub-box I' beveled at its inner end, the sleeve G, having the sand-cap H, and the hub-band L, substantially as and for the purpose set forth.

In testimony that I claim the foregoing I have hereunto set my hand.

AARON B. G. A. WILLIAMS.

Witnesses:
GEO. F. ALDERMAN,
J. M. CARPENTER.